(12) United States Patent
Rodriguez

(10) Patent No.: US 8,221,540 B2
(45) Date of Patent: *Jul. 17, 2012

(54) REFRACTORY MATERIAL WITH STAINLESS STEEL AND ORGANIC FIBERS

(76) Inventor: Alonso P. Rodriguez, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,856

(22) Filed: Jan. 5, 2012

(65) Prior Publication Data

US 2012/0096795 A1    Apr. 26, 2012

Related U.S. Application Data

(63) Continuation of application No. 12/091,243, filed as application No. PCT/US2007/062147 on Feb. 14, 2007, now Pat. No. 8,118,925.

(60) Provisional application No. 60/773,055, filed on Feb. 15, 2006.

(51) Int. Cl.
*C04B 14/48* (2006.01)
*C04B 16/00* (2006.01)
*C04B 22/04* (2006.01)
*E04C 2/00* (2006.01)
*E04C 2/54* (2006.01)
*E04C 2/32* (2006.01)
*E04B 2/30* (2006.01)

(52) U.S. Cl. ....... 106/644; 52/232; 52/783.14; 52/483.1

(58) Field of Classification Search ......................... None
See application file for complete search history.

(56) References Cited

U.S. PATENT DOCUMENTS

| 3,953,953 | A | * | 5/1976 | Marsden | 428/603 |
| 4,146,402 | A | * | 3/1979 | Kira et al. | 106/644 |
| 5,426,267 | A | * | 6/1995 | Underhill et al. | 181/210 |
| 6,881,256 | B2 | * | 4/2005 | Orange et al. | 106/644 |
| 2004/0157725 | A1 | | 8/2004 | Doza et al. | |

OTHER PUBLICATIONS

Written Opinion of the International Searching Authority, dated Mar. 4, 2008, in PCT/US2007/062147.
Abstract of JP 02-225380 A (Kurosaki Refract Co., Ltd.), Sep. 9, 1990.
Abstract of JP 10-310478 (Tokyo Yogyo Co., Ltd.), Nov. 24, 1998.
Abstract of KR 10-2003-0017108 A (Posco Co., Ltd. et al.), Mar. 3, 2003.

* cited by examiner

*Primary Examiner* — Anthony J Green
*Assistant Examiner* — Karam Hijji
(74) *Attorney, Agent, or Firm* — Laura M. Lloyd; Sheldon Mak & Anderson

(57) ABSTRACT

A refractory includes a cement, a binder and a matrix. The matrix comprises both stainless steel fibers and organic fibers. The refractory can be easily cast, without additional steel reinforcement, into large fire wall 16 panels 10 capable of meeting the requirements of testing conducted in accordance with ASTM E-119, *Standard Test Methods for Fire Tests of Building Construction and Materials* in support of IEEE Std. 979-1994, *Guide for Substation Fire Protection*. The fire wall 16 assembly withstood the fire endurance test without passage of flame and gases hot enough to ignite cotton waste during a four-hour fire exposure. The assembly also withstood a 45 psi water stream for five minutes immediately following the four-hour fire exposure period. This is a stringent mechanical requirement, as all fire walls 16 must maintain their integrity before, during and after a fire, per the *Universal Building Code's* definition of a true fire wall 16.

16 Claims, 7 Drawing Sheets

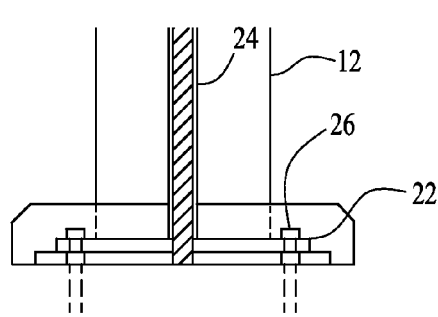
$fig.18$
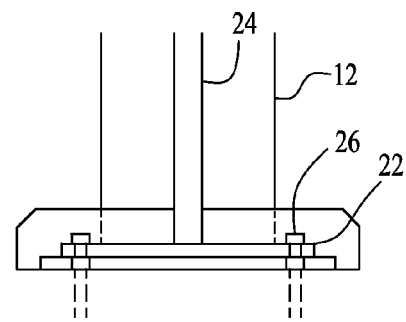
$fig.19$
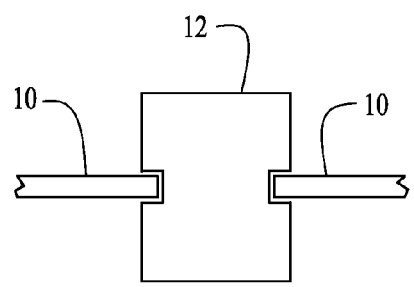
$fig.2A$
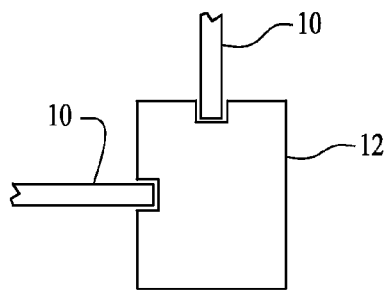
$fig.2B$
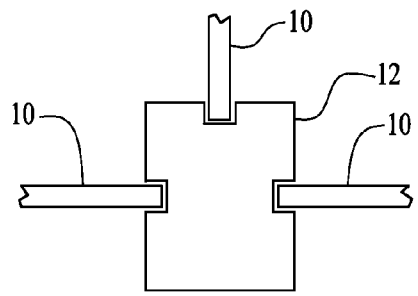
$fig.2C$
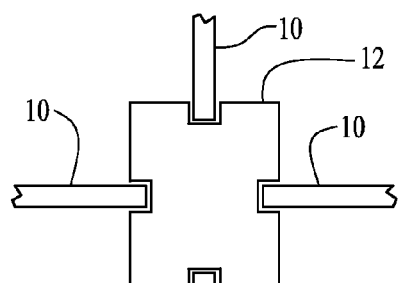
$fig.2D$

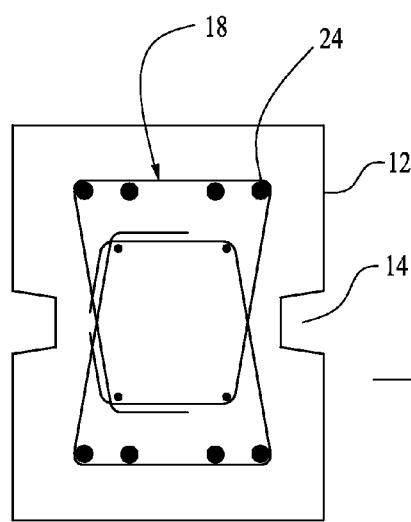
fig.6
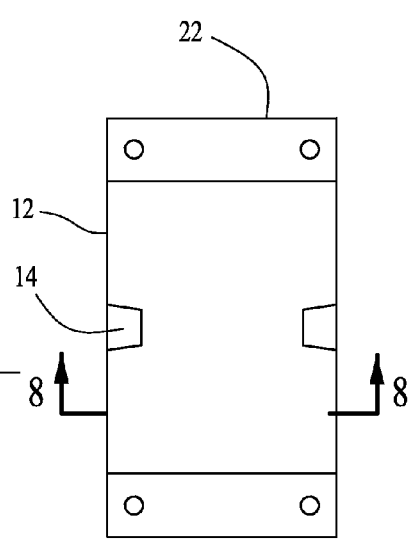
fig.7
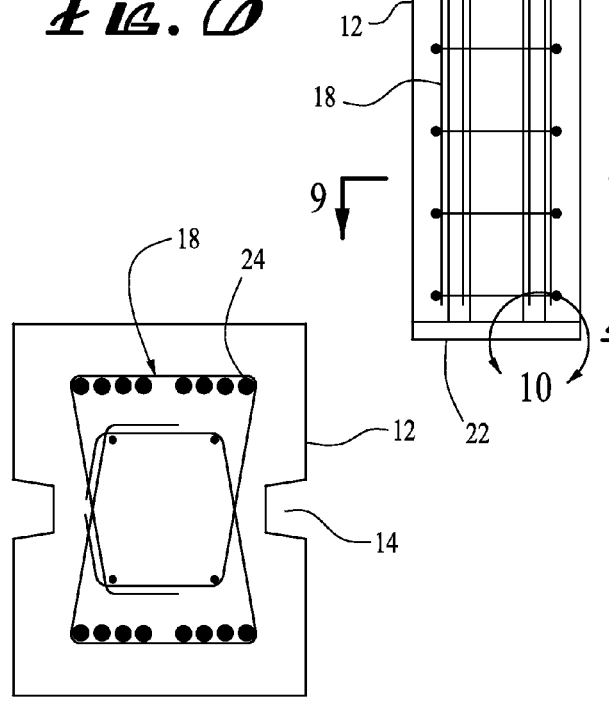
fig.8
fig.9
fig.10

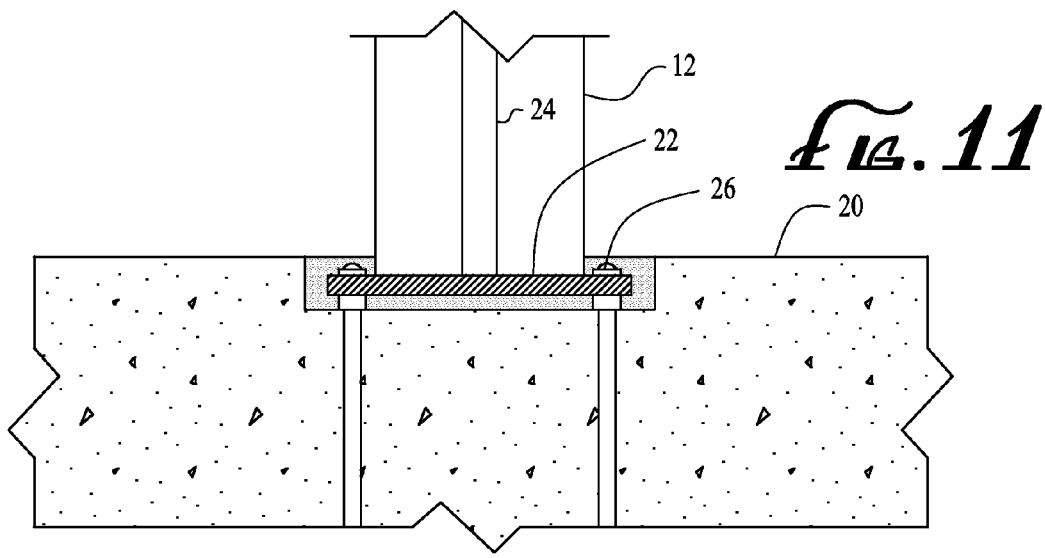
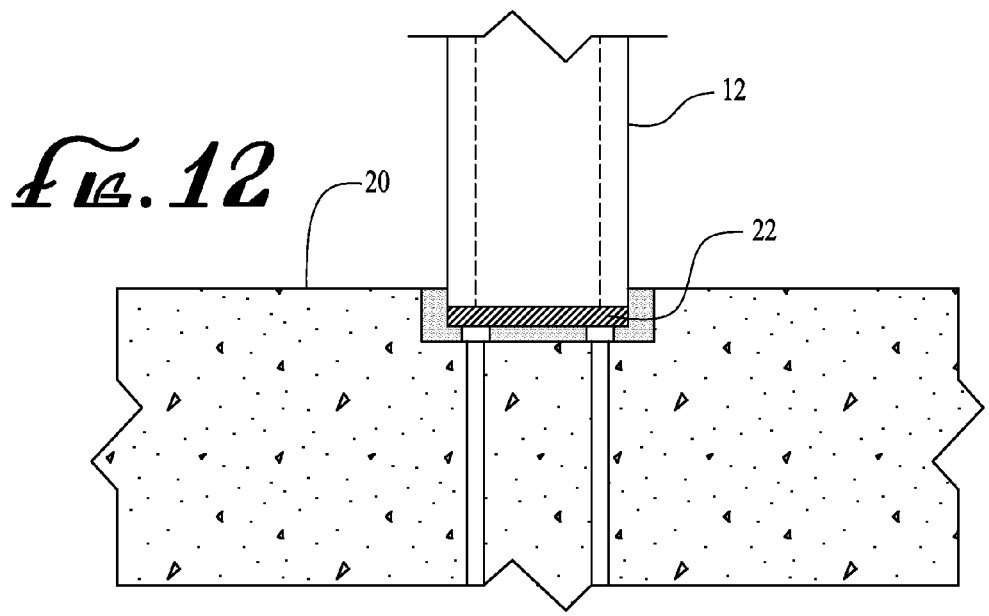
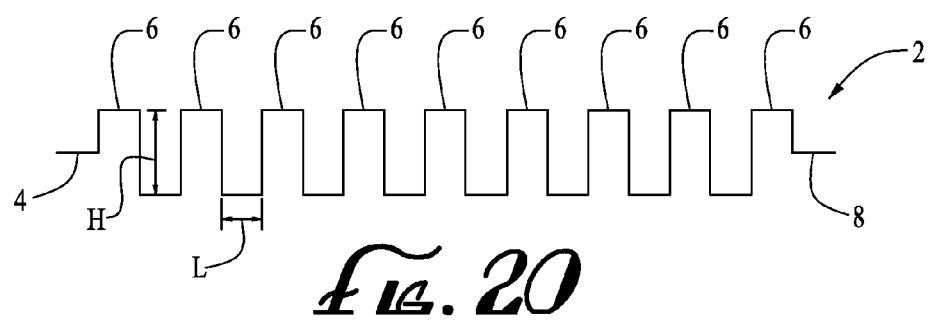

REFRACTORY MATERIAL WITH STAINLESS STEEL AND ORGANIC FIBERS

CROSS-REFERENCE TO RELATED APPLICATION

This application is a continuation of U.S. patent application Ser. No. 12/091,243, now U.S. Pat. No. 8,118,925, filed on Aug. 14, 2008, entitled "REFRACTORY MATERIAL WITH STAINLESS STEEL AND ORGANIC FIBERS" which in turn claims priority from PCT International Patent Application No. PCT/US2007/062147, filed on Feb. 14, 2007, entitled "REFRACTORY MATERIAL WITH STAINLESS STEEL AND ORGANIC FIBERS," which claims priority from U.S. provisional patent application No. 60/773,055, filed Feb. 15, 2006, entitled "Removable Fire Walls," the contents of which are incorporated herein by reference in their entirety.

FIELD OF THE INVENTION

This invention relates generally to refractory materials and large fire walls made from such refractory materials.

BACKGROUND OF THE INVENTION

Large fire walls, such as fire walls capable of providing protection against fires in oil refineries and large electrical transformers are traditionally made from ordinary concrete. The problem with fire walls constructed from ordinary concrete is that they must be extremely thick to adequately withstand the high temperatures created from large hydrocarbon pool fires with long durations (typically 2000° F. and lasting six hours or more).

Accordingly, there is a need for new materials from which large fire walls can be created which provide sufficient protection against large, very long-lasting and hot fires without requiring excessive thickness to simultaneously meet severe mechanical requirements.

SUMMARY

The invention satisfies this need. The invention is a refractory composition comprising a cement, a binder and a matrix material, wherein the matrix material comprises both stainless steel fibers and organic fibers. The refractory can be easily cast, without additional steel reinforcement, into large fire wall panels capable of meeting the requirements of testing conducted in accordance with ASTM E-119, *Standard Test Methods for Fire Tests of Building Construction and Materials* in support of IEEE Std. 979-1994, *Guide for Substation Fire Protection*. The fire wall assembly withstood the fire endurance test without passage of flame and gases hot enough to ignite cotton waste during a four-hour fire exposure. The assembly also withstood a 45 psi water stream for five minutes immediately following the four-hour fire exposure period. This is a stringent mechanical requirement, as all fire walls must maintain their integrity before, during and after a fire, per the *Universal Building Code's* definition of a true fire wall.

DRAWINGS

These and other features, aspects and advantages of the present invention will become better understood with reference to the following description, appended claims and accompanying drawings where:

FIG. 2A is a cross-sectional view of a vertical beam from FIG. 1, showing the insertion of two walls disposed on opposite sides of the vertical beam;

FIG. 2B is a first alternative cross-sectional view of a vertical beam, showing the insertion of two walls disposed at right angles with one another;

FIG. 2C is a second alternative cross-sectional view of a vertical beam, showing the insertion of three walls into the vertical beam;

FIG. 2D is a third alternative cross-sectional view of a vertical beam, showing the insertion of four walls into the vertical beam;

FIG. 6 is a rebar tying diagram for rebar reinforcement useable in a vertical beam within the invention;

FIG. 7 is a plan view of a vertical beam useable in the invention showing the vertical beam's attachment to a base plate;

FIG. 8 is a cross-sectional view of the vertical beam illustrated in FIG. 7, taken along line 8-8;

FIG. 9 is a cross-sectional view of the vertical beam illustrated in FIG. 8, taken along line 9-9;

FIG. 10 is a detail view of the attachment of the base plate to rebar reinforcement within the vertical beam illustrated in FIG. 8;

FIG. 11 is a front view illustrating the installation of a vertical beam useable in the invention to a foundation;

FIG. 12 is a side view illustrating the installation of the vertical beam illustrated in FIG. 11;

FIG. 18 is a front view of the vertical beam illustrated in FIGS. 13 and 16;

FIG. 19 is a rear view of the vertical beam illustrated in FIG. 13; and

FIG. 20 is a side view of a stainless steel fiber useable in the invention.

DETAILED DESCRIPTION

Figure 1:
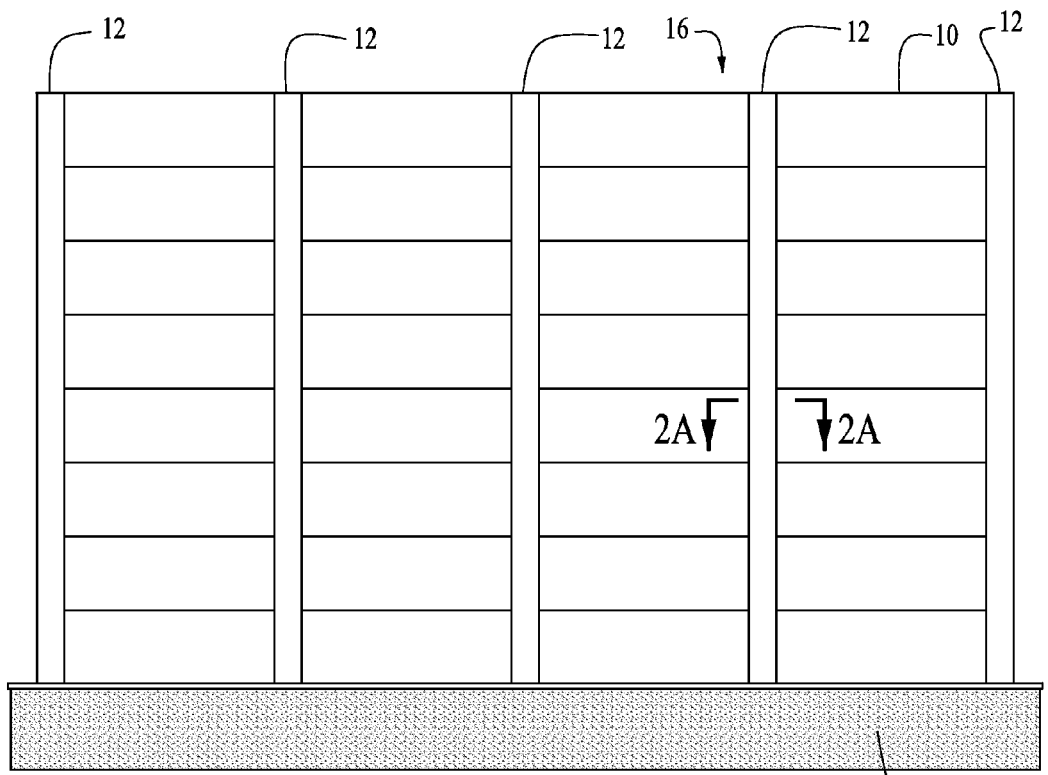
FIG. 1 is a side view of a fire wall having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a refractory comprising a cement, a binder, water and a matrix material. The matrix material comprises both stainless steel fibers and organic fibers.

The cement can be any suitable cement, such as Portland cement. The binder can be any suitable binder, such as calcium silicate or aluminum silicate.

Where the refractory comprises calcium silicate and Portland cement, the water content is typically between about 10% and about 15% of the combined weight of the calcium silicate, Portland cement and water, more typically between about 11% and about 12%.

In addition to stainless steel fibers and organic fibers, the matrix typically comprises a variety of other mineral fillers. A typical premix of cement, binder and the non-stainless steel and non-organic portion of the matrix contains 40% to 60% (by weight) aluminum oxide, 0% to 20% (by weight) aluminum silicate, up to 30% cement, smaller amounts of crestobalite silica and quartz silica, and water.

An exemplar of such typical premix contains 44.5% (by weight) silicon dioxide, 34.1% (by weight) aluminum oxide, 16.5% (by weight) calcium oxide, 1.8% (by weight) ferric oxide and 13% water. This exemplar premix is capable of forming a concrete having the following typical characteristics:

| Permanent Linear Change | % |
|---|---|
| After heating to: | |
| 110° C. (230° F.) | −0.10 |
| 425° C. (800° F.) | −0.15 |
| 650° C. (1200° F.) | −0.30 |

| Density | g/cm³ | kg/m³ | pcf |
|---|---|---|---|
| After heating to: | | | |
| 110° C. (230° F.) | 2.12 | 2120 | 132 |
| 425° C. (800° F.) | 2.10 | 2100 | 131 |
| 650° C. (1200° F.) | 2.08 | 2080 | 130 |

| Modulus of Rupture | MPa | kg/cm² | psi |
|---|---|---|---|
| As cured: | 8.00 | 81.58 | 1160 |
| After heating to: | | | |
| 110° C. (230° F.) | 8.62 | 87.91 | 1250 |
| 425° C. (800° F.) | 6.55 | 66.81 | 950 |
| 650° C. (1200° F.) | 4.48 | 45.71 | 650 |

| Cold Crushing Strength | MPa | kg/cm² | psi |
|---|---|---|---|
| As cured: | | | |
| 1 day | 31.0 | 316.46 | 4500 |
| 3 days | 37.9 | 386.78 | 5500 |
| 7 days | 39.3 | 400.84 | 5700 |
| 28 days | 50.0 | 499.30 | 7100 |

| Thermal Conductivity | W/m ° K | BTU-in/hr-ft²-° F. |
|---|---|---|
| (Hot Wire Method ASTM C-1113) After heating to: | | |
| 100° C. (210° F.) | 1.17 | 8.11 |
| 250° C. (480° F.) | 1.15 | 7.97 |
| 450° C. (840° F.) | 1.26 | 8.74 |
| 600° C. (1110° F.) | 1.27 | 8.81 |

| Coefficient of Thermal Expansion | |
|---|---|
| From 110° F.-1600° F. | $3.75 \times 10^{-6}$/° F. |
| From 38° C.-871° C. | $6.72 \times 10^{-6}$/° C. |

In the matrix, stainless steel is used instead of ordinary steel because of stainless steel's higher temperature resistance, higher strength, non-corrosion characteristics and non-magnetic properties.

The stainless steel fibers can be 304 type stainless steel fibers. Other types of stainless steel from the 300 Series can also be used to make the fibers, such as: 301, 302, 303, 309, 316, 321 and 347. Typically, the weight percentage of the stainless steel fibers within the dry refractory mix (before water is added) is between about 1.2% and about 1.6% (by weight) of the dry refractory mix.

The stainless steel fibers are preferably corrugated to increase the effective surface area of the fibers and to facilitate their bonding and attachment within the matrix. In one embodiment of the invention, the stainless steel fibers each have a length of about one inch, a width of about 0.045 inch and a thickness of about 0.02 inches. These exemplary stainless steel fibers are corrugated such as the stainless steel fiber 2 illustrated in FIG. 20. Each stainless steel particle 2 has a base section 4 having a length of about 0.18 inch, followed by nine alternating positive and negative corrugations 6. Each corrugation 6 has a height h of about 0.0075 inch and a length l of about 0.08 inch long. After the series of nine corrugations, the particle terminates with a second, oppositely disposed base section 8 having a length of about 0.1 inch. Such stainless steel fibers can be purchased from Fibercon International of Evans City, Pa.

The organic fibers are important in the refractory to provide minute channels (upon melting during a fire) to facilitate gas venting without fracturing the refractory. These fibers also mitigate crack formation during curing.

The organic fibers can comprise polypropylene fibers, preferably in excess of 90% polypropylene fibers. Typically, at least about 90% of the organic fibers have a length between about 0.2 inch and about 0.3 inch and a diameter between about 0.001 inch and about 0.002 inch.

The organic fibers are typically about 1% by weight of the dry refractory mix. The fibers have a variety of shapes and are not necessarily linear. The length of each of the organic fibers is most typically 0.25 inches. Typically, the fibers have a relatively constant circular cross-section with a diameter between about 0.001 and about 0.004 inches. In a typical embodiment of the invention, smaller diameter organic fibers greatly outnumber larger diameter organic fibers, for example by at least a ratio of 50:1. Such organic fibers can be purchased from Allied Mineral of Columbus, Ohio.

Both the stainless steel fibers and the organic fibers are randomly oriented within the refractory.

Refractory panels 10 can be conveniently cast from the refractory of the invention. Cure time for even very large panels 10 is as little as 12 hours at ambient temperatures. Kiln drying is not required.

A typical refractory of the invention has the following characteristics:

1. Mechanical Properties at Ambient Temperature:
    a. Specific gravity: 134 pcf
    b. Modulus of elasticity, E, ksi:
        2,500-5,000 Unreinforced (UR);
        15,000-25,000 Steel Reinforced (SR)
    c. Shear Strength, $F_v$, ksi (reported as Modulus of Rupture for ceramics and refractories):
        1.1 (UR);
        14.4 (SR)
    d. Bending Strength $F_b$, ksi:
        Not applicable for UR matrix;
        34.8 (SR)
    e. Tension and compress strength, $F_t$ and Fc ksi:
        5.25 (UR-compression; $F_t$<290 psi, hence not usually used for characterizing inelastic materials); 52 tension and 48 compression (SR)
2. Electrical Conductivity and Other Electrical Properties (UR):
    Dielectric strength=90 v/mil; Dielectric constant about 5; Resistivity=$52 \times 10^{10}$ ohm-cm
3. Thermal Properties:
    a. Thermal conductivity (Hot Wire Method ASTM C-1113)

| After heating to | Btu-in/hr-ft$^2$-° F. |
|---|---|
| 400° F. | 4.20 |
| 8000° F. | 4.41 |
| 1200° F. | 4.69 |
| 1825° F. | 4.90 | b. Thermal Expansion Coefficient

| From 100° F. to 2000° F. | $3.75 \times 10^{-6}$/° F. |
|---|---|
| From 38° C. to 1093° C. | $6.72 \times 10^{-6}$/° C. | c. Fire Rating Requirement
    1,205° C. working temperature
d. Mechanical Strength at High Temperatures:

| Modulus of Rupture (unreinforced) | MPa | kg/cm$^2$ | psi |
|---|---|---|---|
| As cured: | 7.58 | 77.36 | 1100 |
| 110° C. (230° F.) | 8.27 | 84.39 | 1200 |
| 540° C. (1000° F.) | 4.48 | 45.71 | 650 |
| 1205° C. (2200° F.) | 7.58 | 77.36 | 1100 |

| Cold Crushing Strength (unreinforced) | MPa | kg/cm$^2$ | psi |
|---|---|---|---|
| As cured: | | | |
| 1 day | 36.20 | 369.2 | 5250 |
| 3 days | 39.92 | 407.2 | 5790 |
| 7 days | 39.78 | 405.8 | 5770 |
| 28 days | 39.30 | 400.0 | 5700 |

| Cold Crushing Strength (unreinforced) | MPa | kg/cm$^2$ | psi |
|---|---|---|---|
| After heating to: | | | |
| 110° C. (230° F.) | 38.61 | 393.8 | 5600 |
| 540° C. (1000° F.) | 29.17 | 297.5 | 4230 |
| 1205° C. (2200° F.) | 38.27 | 390.3 | 5550 |

The refractory composition of the invention can be conveniently cast into an infinite variety of shapes. For example, the refractory composition of the invention can be cast into large panels 10 suitable for use in constructing a high temperature fire walls. Such large panels 10 are typically between about 5 feet and about 10 feet in length, between about 2 feet and about 5 feet in width and between about 1 inch and about 3 inches in thickness. Such panels 10 typically weigh between about 400 pounds and about 800 pounds.

The refractory of the invention can be conveniently mixed within an ordinary cement mixer. After adequate mixing of all of the ingredients, the wet mixture can then be poured into molds. The molds are preferably gently vibrated to eliminate air pockets and to evenly distribute the stainless steel fibers.

Surprisingly, even such large panels 10 do not require additional steel reinforcement within the panel, such as steel frameworks and rebar cages. In fact, the use of such additional steel reinforcement has been found in many cases to be detrimental to the integrity of the panel 10 when subjected to high heat followed by a rapid cool down. Cracking can occur during cool down of panels 10 having additional steel reinforcement due to the disparity in coefficients of expansion between the additional steel reinforcement and the refractory composition.

Figure 2:
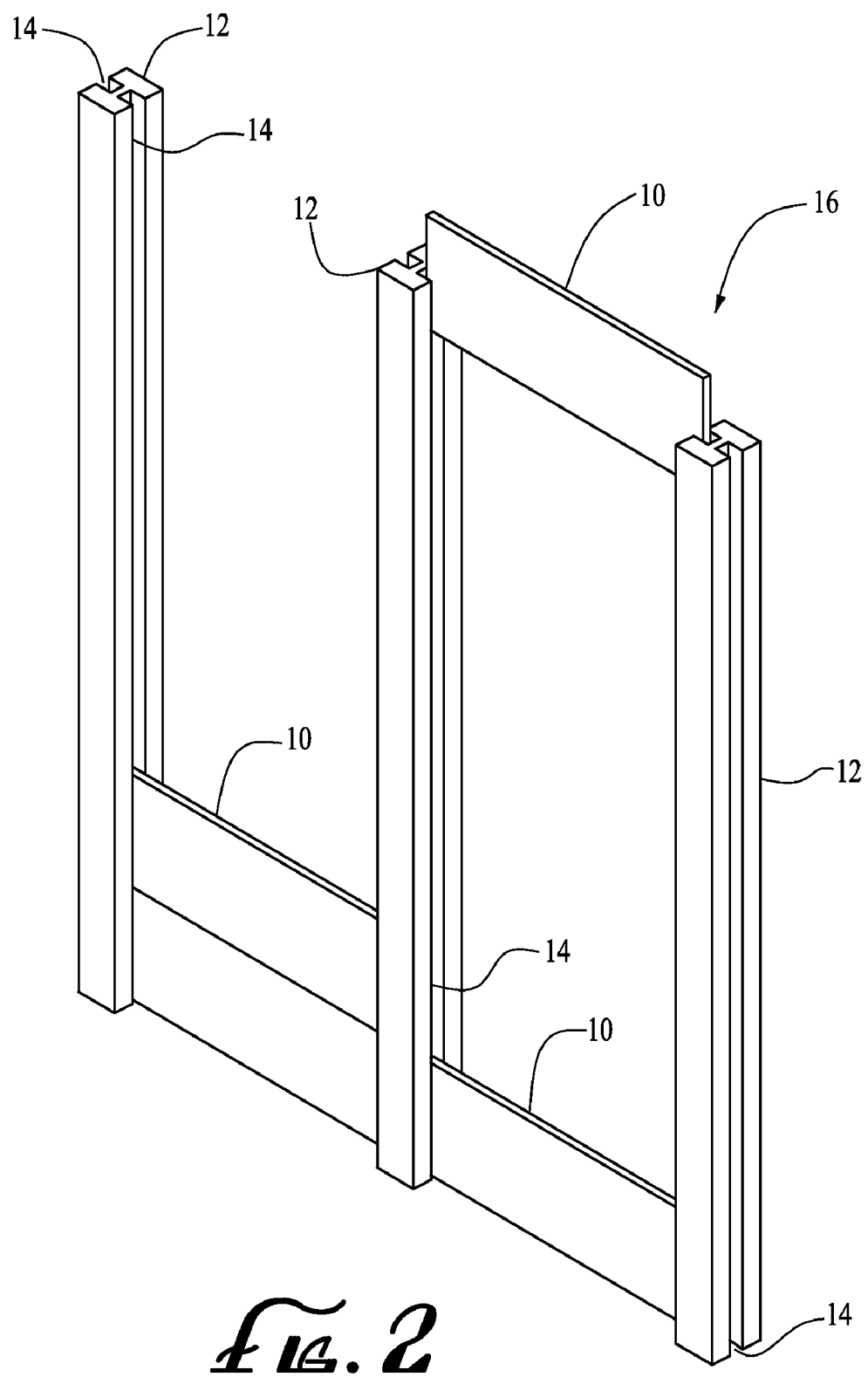
FIG. 2 is a perspective view of a partially completed fire wall having features of the invention.
Figure 4:
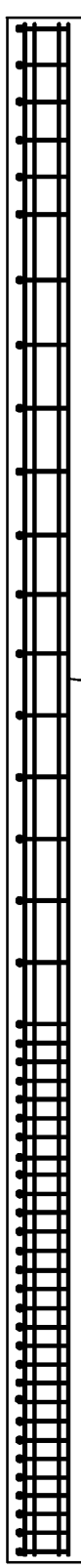
FIG. 4 is a side view showing rebar reinforcement disposed within the vertical beam illustrated in FIG. 3.
Figure 5:
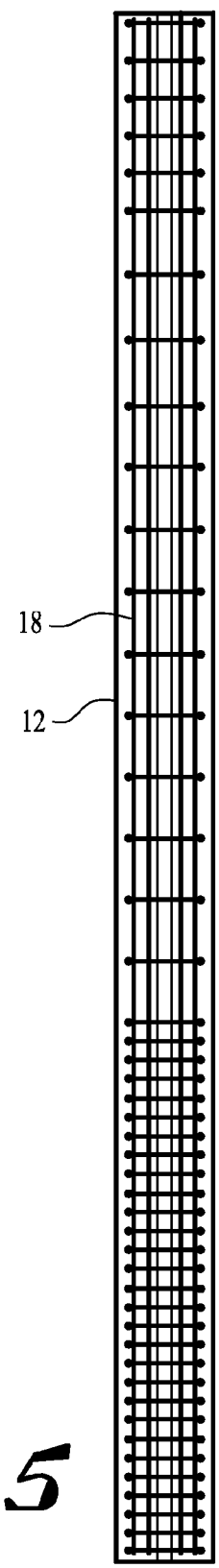
FIG. 5 is a front view showing rebar reinforcement disposed within the vertical beam illustrated in FIG. 3.
Figure 13:
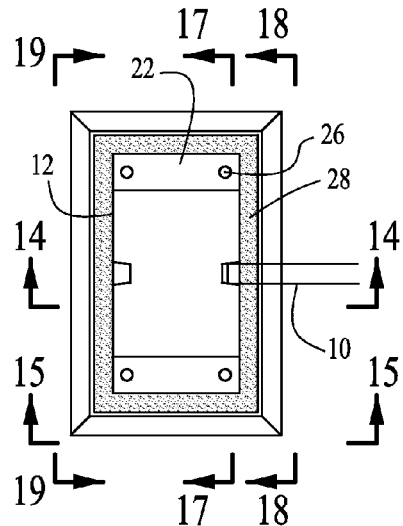
FIG. 13 is a plan view of the vertical beam showing an enclosure for the protection of its base plate.
Figure 14:
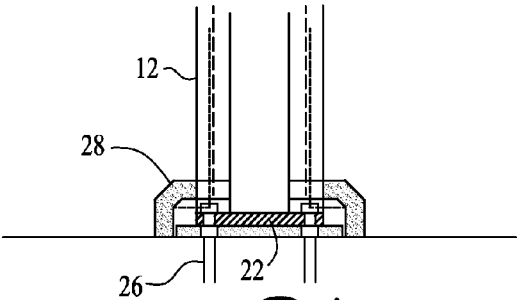
FIG. 14 is a cross-sectional view of the vertical beam illustrated in FIG. 13 taken along line 14-14.
Figure 15:
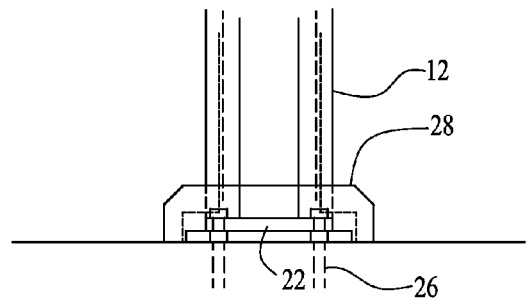
FIG. 15 is a side view of the vertical beam illustrated in FIG. 13.
Figure 16:
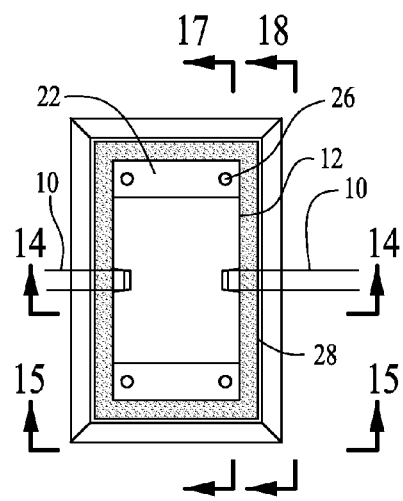
FIG. 16 is a second plan view of a vertical beam having a base plate protected by a protective enclosure.
Figure 17:
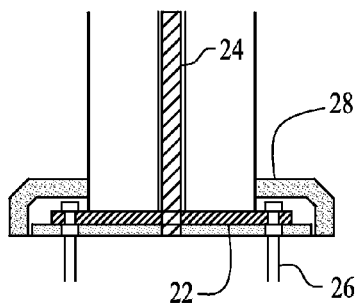
FIG. 17 is a cross-sectional view of the vertical beam illustrated in FIG. 16 taken along line 17-17.

Fire walls 16 made with such large panels 10 can comprise a plurality of panels 10 disposed between vertical beams 12, such as illustrated in FIGS. 1 and 2. Both the panels 10 and the vertical beams 12 can be cast from the refractory of the invention.

Figure 3:
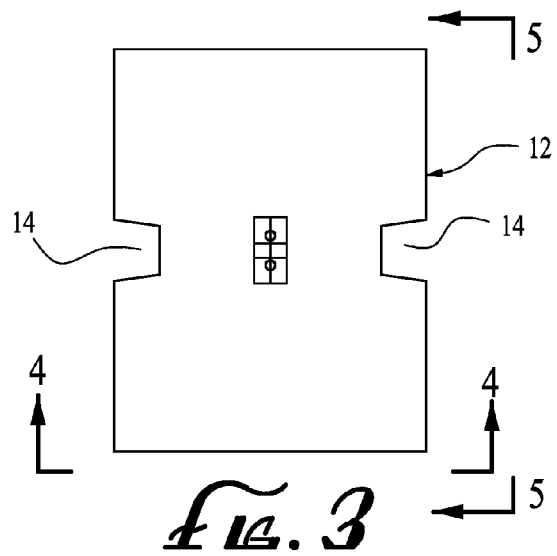
FIG. 3 is a detail plan view of a vertical beam useable in the invention.

The vertical beams 12 weigh typically in excess of 5000 pounds. Each vertical beam 12 preferably comprises a slot 14 into which a plurality of panels 10 can be stacked one on top of the other to form fire walls 16 of various shapes (see FIGS. 2A-2B and 3).

Unlike panels 10 cast from the refractory of the invention, vertical beams 12 cast from the refractory are typically reinforced with rebar cages 18 in the same manner as ordinary concrete beams are reinforced with rebar cages (see FIGS. 4, 5, 6, 8 and 9).

The vertical beams 12 typically are attached to a traditional concrete foundation 20 using a base plate 22 which is welded to steel reinforcement bars 24 disposed within the vertical beams 12 (see FIG. 10). The base plate 22 is made of steel and attached to the foundation using steel bolts 26, and so must be protected in the event of a fire. Such protection can be provided by installing a base plate cover 28 made from the refractory of the invention around each of the base plates 22 (see FIGS. 13-17).

Alternatively, the vertical beams 12 can be standard I beams or H beams (not shown) which have been clad with the refractory of the invention.

An optional door (not shown) can be created within the fire wall 16. Such a door can be used for access by maintenance personnel. The door can be made of short panels of the present refractory and can be made to slide into a door frame. Typically, the door is located next to a vertical beam 12 with hinges for the door attached to the beam 12.

Such modular fire walls 16 provide easy assembly and disassembly at the site and are completely removable. The modular characteristics of the fire wall 16 simplify specification, assembly and disassembly, and minimize manufacturing and insulation costs without compromising thermal or mechanical performance.

Large fire walls 16 of the invention have been found to comply with the standards for a four-hour rating under ASTM E-119 as previously stated.

The refractory of the invention provides many advantages over most refractories of the prior art. The invention provides a high-strength refractory having excellent fire resistance. Expansion and contraction between temperatures below freezing and temperatures in excess of 900° C. are relatively small. The refractory is corrosion, mold, rot and infestation resistance. It is impermeable to moisture, to air and to other gases. Cracking during curing is minimal, as is cracking during initial temperature increases (up to about 150° C.) and when subject to high temperatures (temperatures higher than 150° C.). The refractory has the built-in ability to relieve trapped gases at medium and high temperatures. The refractory can be fully cured at ambient temperature and pressure.

Having thus described the invention, it should be apparent that numerous structural modifications and adaptations may be resorted to without departing from the scope and fair meaning of the present invention.

What is claimed is:

1. A fire wall cast from a refractory composition, the refractory composition comprising:
   (a) a cement;
   (b) a binder; and
   (c) a matrix material comprising 300 series stainless steel fibers and organic fibers, and a refractory aggregate comprising aluminum oxide, calcium oxide, iron oxide and silicon dioxide or a combination thereof.

2. The fire wall of claim 1 comprising a plurality of panels disposed between vertical beams, both the panels and the vertical beams being cast from a refractory composition, wherein the panels contain no additional steel reinforcement.

3. The fire wall of claim 2 wherein the panels have a pair of opposed end edges and wherein the vertical beams comprise a groove into which an end edge of each panel is disposed.

4. The fire wall of claim 1 wherein the fire wall is cured at ambient temperature.

5. The fire wall of claim 2 wherein the panels can be adjusted in the vertical beams.

6. The fire wall of claim 3 wherein the groove in the vertical beams comprises a tapered edge.

7. The fire wall of claim 2 comprising one or more panels, the panels measuring between about 5 feet and about 10 feet in length, between about 2 feet and about 5 feet in width, and between about 1 inches and about 3 inches in thickness.

8. The fire wall of claim 7 wherein the one or more panels maintain impact strength of at least 45 pounds per square inch at about 2000 degrees Fahrenheit.

9. The fire wall of claim 7 wherein the one or more panels are corrosion, rot, and erosion resistant.

10. The fire wall of claim 7 wherein the cold crushing strength of the one or more panels is 5,250 pounds per square inch after 24 hours of curing at ambient temperature.

11. The fire wall of claim 7 wherein the one or more panels weigh between 400 and 800 pounds.

12. The fire wall of claim 7 wherein the vertical beams comprise a steel base plate and wherein the steel base plate is encapsulated by a box cast from a refractory.

13. The fire wall of claim 7 wherein the panels are cured at ambient temperature.

14. The fire wall of claim 7 wherein the panels can be adjusted in the vertical beams.

15. The fire wall of claim 12 wherein the steel base plate is recessed below the grade.

16. A panel for use in a firewall, the panel cast from a refractory composition, the refractory composition comprising:
   (a) a cement;
   (b) a binder; and
   (c) a matrix material comprising 300 series stainless steel fibers and organic fibers, and a refractory aggregate comprising aluminum oxide, calcium oxide, iron oxide and silicon dioxide or a combination thereof.

* * * * *